United States Patent [19]
Hirsch

[11] 3,974,913
[45] Aug. 17, 1976

[54] BLIND RIVET MAGAZINE
[76] Inventor: Richard F. Hirsch, 708 W. 38th St., San Pedro, Calif. 90731
[22] Filed: Apr. 3, 1975
[21] Appl. No.: 564,704

Related U.S. Application Data
[63] Continuation-in-part of Ser. No. 491,929, July 25, 1974, Pat. No. 3,886,783.

[52] U.S. Cl. .............................................. 206/344
[51] Int. Cl.² .................. B65D 83/02; B65D 85/24
[58] Field of Search ................... 206/344, 343, 338; 85/70, 77, 78

[56] References Cited
UNITED STATES PATENTS

| | | | |
|---|---|---|---|
| 2,536,353 | 1/1951 | Cooper | 85/77 |
| 2,982,595 | 5/1961 | Rogers, Jr. | 206/344 |
| 3,227,270 | 1/1966 | Floyd, Jr. | 206/338 |

*Primary Examiner*—William T. Dixson, Jr.
*Attorney, Agent, or Firm*—Philip M. Hinderstein

[57] ABSTRACT

A magazine for use in continuously feeding blind rivets into a riveting tool comprising a first elongate paper sheet positioned in a substantially planar configuration and a second elongate paper sheet formed into a plurality of parallel, generally semi-cylindrical lobes spaced by planar sections, the planar sections of the second sheet being connected to one side of the first sheet, the lobes of the second sheet and the enclosing portions of the first sheet defining a plurality of spaced openings for snugly receiving the mandrels of the rivets. The length of at least some of the planar sections of the second sheet are of a size suitable for loosely receiving sheared mandrels between the lobes on opposite sides thereof for conducting such sheared mandrels through the riveting tool. The first and second sheets have a plurality of spaced holes therein for use in advancing the magazine through the riveting tool.

10 Claims, 3 Drawing Figures

BLIND RIVET MAGAZINE

CROSS-REFERENCE TO RELATED APPLICATION

This application is a continuation-in-part of my copending application Ser. No. 491,929, filed July 25, 1974, for Automatic Loading Blind Riveter, now U.S. Pat. No. 3,886,783.

BACKGROUND OF THE INVENTION

1. Field of the Invention

The present invention relates to a blind rivet magazine and, more particularly, to a magazine for use in continuously feeding blind rivets into and conducting sheared mandrels through a riveting tool.

2. Description of the Prior Art

The term "blind rivet" refers to rivets of the type which are accessible from only one side thereof during a riveting operation. Such rivets include a tubular sleeve having a generally annular preformed head at one end thereof. The sleeve has a mandrel extending axially therethrough and the mandrel has an enlarged head adjacent the other end of the sleeve. During the riveting operation, the rivet is axially inserted through aligned holes in the work pieces to be secured together by extending the mandrel head and the other end of the sleeve into such aligned holes until the head of the rivet sleeve contacts one of the work pieces. Thereafter, the head of the rivet sleeve is held against the one work piece while an axial force is exerted on the mandrel in a direction opposite to the force on the rivet sleeve head. This force on the mandrel pulls the enlarged head towards the rivet sleeve head, deforming the tubular sleeve on the inaccessible side of the work pieces, setting the rivet. Finally, the mandrel breaks at a point inside of the sleeve, trapping the mandrel head and a short length of the mandrel within the deformed sleeve and permitting removal of the major portion of the sheared mandrel.

Conventional blind riveting tools usually consist of a hand-held, gun-type assembly, either hand operated or power actuated, and include components suitably designed to carry out the foregoing operation. Such conventional tools have been manually loaded, with the rivet mandrel being positioned, by hand, in the nose of the tool, one at a time, for each riveting operation. In cases where a large number of rivets are to be installed, this has been an overly time-consuming process.

In my beforementioned copending application, there is disclosed an automatic loading blind riveter for automatically loading and setting blind rivets. Such blind riveter includes movable guide jaws and movable breaking jaws which are highly efficient in operation and permit the size of the nose of the riveter to be minimized. Thus, such riveter may be manipulated into the smallest areas encountered during field use. The construction of the riveter is highly simplified and efficient so that the tool is relatively inexpensive and has a long service life. The movable parts are driven by a pair of coaxial operating pistons which are both circular in cross-section and nested one inside the other. This arrangement eliminates bearings, contributing to the simplicity, inexpensiveness, and efficiency of operation.

SUMMARY OF THE INVENTION

According to the present invention, there is provided a magazine for use in continuously feeding blind rivets into a riveting tool of the type described in my beforementioned copending patent application. The present magazine is made entirely from paper, of a type referred to as "card stock," which is presently readily available. The magazine is inexpensive and may be disposed of after use, if desired. The magazine is flexible and may be coiled into a small space, ready for use.

Briefly, the present magazine includes a first elongate paper sheet positioned in a substantially planar configuration and a second elongate paper sheet formed into a plurality of parallel, generally semi-cylindrical lobes spaced by planar sections, the planar sections of the second sheet being connected to one side of the first sheet, the lobes of the second sheet and the enclosing portions of the first sheet defining a plurality of spaced openings for snugly receiving the mandrels of the rivets. The magazine has a plurality of spaced holes therein for use in advancing the magazine through the riveting tool. Furthermore, the length of the planar sections between at least some adjacent lobes is such as to loosely receive the broken-off piece of each mandrel after the riveting tool has set the rivet. Thus, the lobes convey the sheared mandrels to a collecting chute where they may be automatically conducted out of the riveting tool, as the magazine is advanced therethrough.

OBJECTS

It is therefore an object of the present invention to provide a blind rivet magazine.

It is a further object of the present invention to provide a magazine for use in continuously feeding blind rivets into a riveting tool.

It is a still further object of the present invention to provide a magazine for use in conducting sheared mandrels through a riveting tool.

It is another object of the present invention to provide an inexpensive, disposable, paper magazine for use in continuously feeding blind rivets into a riveting tool.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like or corresponding parts in the several figures and wherein:

DESCRIPTION OF THE PREFERRED EMBODIMENT

Figure 1:
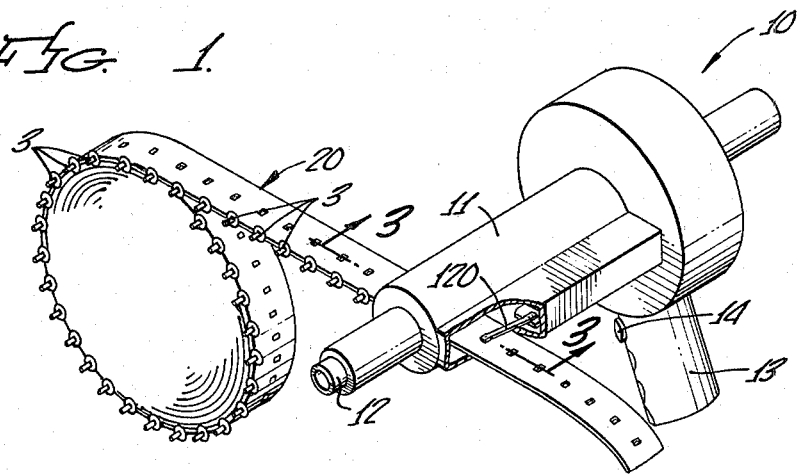
FIG. 1 is a perspective view of an automatic loading blind riveter constructed in accordance with the teachings of my beforementioned copending application and the present magazine for use in continuously feeding blind rivets into such riveting tool.

Referring now to the drawings, there is shown an automatic loading blind riveter, generally designated 10, of the type described more fully in my copending patent application Ser. No. 491,929, filed July 25, 1974, now U.S. Pat. No. 3,886,783. Blind riveter 10 is useful in setting blind rivets, generally designated 3, of the type including a tubular sleeve 5 having an annular head 6 at one end thereof and a mandrel 7 having an enlarged head 8 adjacent the other end of sleeve 5. As is known in the art, such rivets are used when only one side of a work piece is accessible during a riveting operation.

During the riveting operation, rivet 3 is axially inserted through aligned holes in the work pieces to be secured together by extending mandrel head 8 and sleeve 5 into such aligned holes until head 6 of sleeve 5 contacts one of the work pieces. Thereafter, head 6 is held against the work piece while an axial force is exerted on mandrel 7 in a direction opposite to the force on head 6. This force on mandrel 7 pulls head 8 towards head 6, deforming sleeve 5 on the inaccessible side of the work pieces and setting rivet 3. Finally, mandrel 7 breaks at a point inside of sleeve 5, trapping head 8 and a short length of mandrel 7 within the deformed sleeve 5 and permitting removal of the major portion of the sheared mandrel 7'.

As described more fully in my beforementioned copending patent application, blind riveter 10 automatically achieves this operation and includes an elongate, generally cylindrical hollow housing 11 which is adapted to be held stationary during the operation thereof. Housing 11 has a nose 12 at one end thereof through which rivets 3 pass. The other end of housing 11 is connected adjacent a handle 13 which is adapted to be grasped by the hand of a user, handle 13 supporting a trigger 14 which is the sole actuating element required for the operation of riveter 10.

Riveter 10 includes two major subassemblies, one subassembly being responsible for setting rivets 3 and the second subassembly being responsible for feeding rivets 3 into riveter 10 and conducting the sheared mandrels 7' out of riveter 10. For a fuller discussion of such subassemblies, reference should be had to my beforementioned patent application. For present purposes, suffice it to say that riveter 10 includes guide means, generally designated 110, for guiding a magazine, generally designated 20, which is the subject of the present invention, laterally through housing 11. Guide means 110 comprises a pair of spaced, parallel plates 111 and 112 which are spaced by an amount approximately equal to the total thickness of magazine 20. Bottom plate 112 has an elongate opening 115 therein, opening 115 being positioned parallel to the axis of housing 11, perpendicular to the direction in which magazine 20 moves through housing 11. Riveter 10 includes a generally rectangular, hollow chute 116 which is open at the top and bottom thereof and which is connected to plate 112, immediately below opening 115 therein.

Riveter 10 includes a feed mechanism for intermittently advancing magazine 20 through housing 11 in time sequence with each riveting operation. For present purposes, the feed mechanism includes an arm 120 which supports at one end thereof a post 144 which extends through a slot 145 in plate 111. The lower surface 146 of post 144 is inclined at a slight angle so as to face inwardly of housing 11.

Magazine 20, for use in continuously feeding blind rivets 3 into and sheared mandrels 7' through riveting tool 10, comprises a first thin, flexible, elongate sheet 21 positioned in a substantially planar configuration and a second thin, flexible, elongate sheet 22 formed into a plurality of parallel, generally semi-cylindrical lobes 23 spaced by alternate planar sections 24 and 25, the length of both of planar sections 24 and 25 being at least as long as the diameter of lobes 23. Planar sections 24 and 25 of sheet 22 are connected to one side of sheet 21 so that sheet 21 in combination with lobes 23 define a plurality of spaced openings 26 in magazine 20. It is significant to note that sheet 22 has a backing sheet 21 on only one side thereof so that the spaces between lobes 23 are open, for reasons which will appear more fully hereinafter.

According to the preferred embodiment of the present invention, magazine 20 is made from a thin, flexible paper, of a type commonly referred to as "card stock", so that magazine 20 may be rolled into a coil, as shown in FIG. 1, for minimizing the space required to store a given number of rivets 3.

Figure 2:
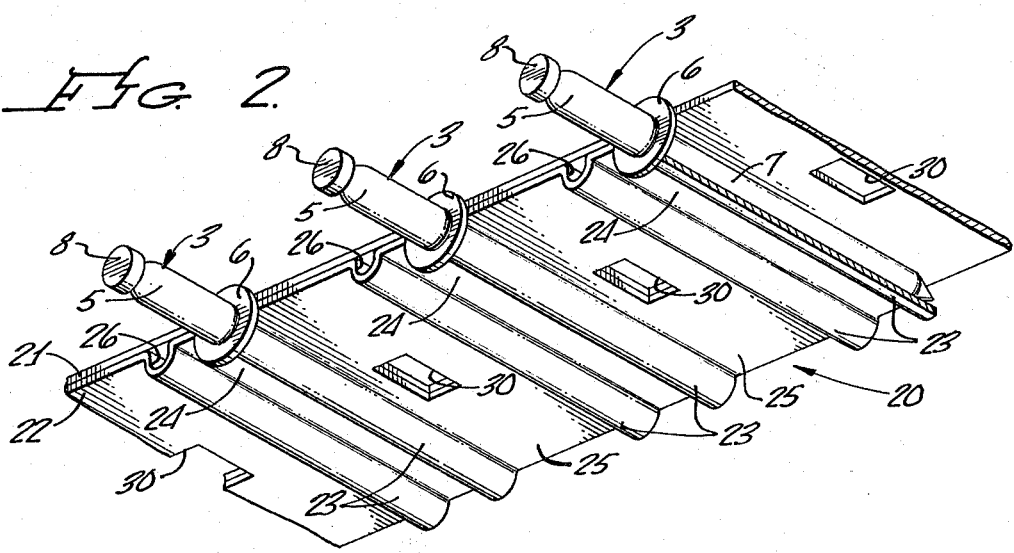
FIG. 2 is an enlarged perspective view of the magazine of FIG. 1.
Figure 3:
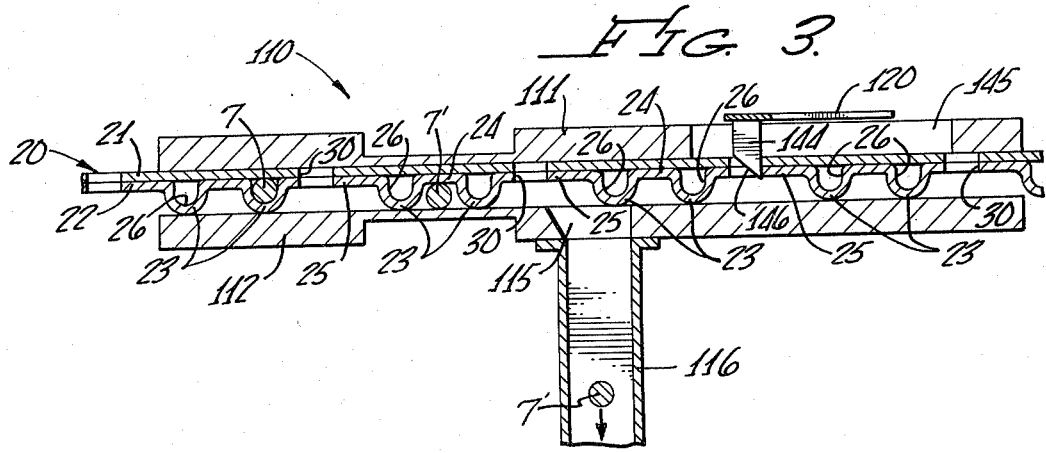
FIG. 3 is a partial sectional view taken along the line 3—3 in FIG. 1.

With reference to FIGS. 2 and 3, the size of openings 26 in magazine 20 is such that they snugly receive mandrels 7 of rivets 3. In addition, and as shown in FIG. 2, the width of sheets 21 and 22 are identical and approximately equal to the length of that portion of mandrel 7 which extends beyond head 6 of sleeve 5 of rivet 3. With such dimensions, rivets 3 are securely held in alternate openings 26, ready for feeding into riveting tool 10, and the pointed ends of mandrel 7 are safely positioned within magazine 20.

As described more fully in my prior copending application, a slide member within riveting tool 10 is operative to contact head 6 of sleeve 5 of rivet 3 and to advance rivet 3 out of its respective opening 26 in magazine 20 and to advance rivet 3 to a point beyond nose 12 of housing 11 and to, thereafter, deposit the broken-off piece of each mandrel 7' between guide plates 111 and 112. Furthermore, the feed mechanism within riveter 10 is a twostep mechanism for moving magazine 20 in two distinct steps. More specifically, at the start of a riveting operation, one of spaced openings 26 in magazine 20, the one in front of planar section 24, is aligned with the axis of housing 11 so that the rivet 3 therein may be removed therefrom and conducted to nose 12 of riveter 10. During the riveting operation, arm 120 is moved by a first amount, sufficient to align the next planar section 24, between lobes 23, with the axis of housing 11, as shown in FIG. 3, so that the sheared mandrel 7' may be deposited between guide plates 111 and 112, between such spaced lobes 23, also as shown in FIG. 3. Thereafter, a second movement of magazine 20 is required to align the next opening 26 having a rivet 3 therein with the axis of housing 11 to permit removal of a second rivet 3 to repeat the operation.

Accordingly, the length of planar sections 24 is such that the space between lobes 23 on opposite sides thereof loosely receives sheared mandrel 7' or rivet 3. In this manner, lobes 23 on opposite sides of planar sections 24 push sheared mandrel 7' along the top surface of plate 112 until mandrel 7' reaches opening 115 in plate 112. At this time, mandrel 7' automatically falls through opening 115, into chute 116, which conducts sheared mandrels 7' out of housing 11.

On the other hand, while alternate planar sections 25 may be equal in length to planar sections 24, they are preferably greater in length than planar sections 24 for a variety of reasons. First of all, because of the size of rivets 3 and the space required by the mechanisms within riveter 10, it is impossible to place a rivet 3 in each of openings 26. Therefore, since the spaces between lobes 23, adjacent planar sections 25, do not receive mandrels 7', they do not have to have the small size discussed previously. By increasing the length of planar sections 25, this permits adequate spacing between consecutive rivets 3 and also provides an area for positioning of a plurality of spaced holes 30 which must extend at least through sheet 21 but preferably also extend through sheet 22, holes 30 being used by post 144 for advancing magazine 20 through riveting tool 10. Thus, as arm 120 moves to the right, as viewed in FIG. 3, post 144 extends into one of holes 30 and moves magazine 20 laterally through riveting tool 10. On the other hand, when arm 120 has moved to its extreme right hand position and returns to the left, as viewed in FIG. 3, lower surface 146 lifts post 144 out of hole 30 and post 144 moves across the top of sheet 21 of magazine 20 until it falls into the next hole 30.

It can therefore be seen that in accordance with the present invention, there is provided a magazine 20 for use in continuously feeding blind rivets into and conducting sheared mandrels through a riveting tool of the type described in my beforementioned copending patent application. Magazine 20 is made entirely from paper, of a readily available type, so that it is inexpensive and may be disposed of after use, if desired. Magazine 20 is flexible and may be coiled into a small space, ready for use.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A magazine for continuously feeding blind rivets into and conducting sheared mandrels from a riveting tool, said rivets being of the type including a tubular sleeve having an annular head at one end thereof and a mandrel extending through the sleeve, the mandrel having an enlarged head adjacent the other end of the sleeve, comprising:
   a first elongate sheet positioned in a substantially planar configuration; and
   a second elongate sheet formed into a plurality of parallel, generally semi-cylindrical lobes spaced by planar sections, said planar sections of said second sheet being connected to one side of said first sheet, said lobes of said second sheet and the enclosing portions of said first sheet defining a plurality of spaced openings for receipt of said mandrels of said rivets, said openings being of such a size that they snugly receive said mandrels, alternate planar sections in said second sheet being longer than the remaining alternate planar sections therein, the length of the shorter alternate planar sections in said second sheet being of such a size that said sheared mandrels are loosely received between the spaced lobes on opposite sides thereof for conducting said sheared mandrels from said riveting tool, the longer alternate planar sections being long enough to permit receipt of rivets in alternate spaced openings without interference between adjacent rivets as said rivets are conducted into said riveting tool and said sheared mandrels are conducted from said riveting tool.

2. A magazine according to claim 1 wherein the width of said first and second sheets is approximately equal to the length of those portions of said mandrels which extend beyond said head of said sleeve of said rivets.

3. A magazine according to claim 1 wherein said first sheet has a plurality of spaced holes therein for use in advancing said magazine through said riveting tool.

4. A magazine according to claim 3 wherein said spaced holes extend through said first and second sheets and are positioned in said longer planar sections of said second sheet.

5. A magazine according to claim 4 wherein the length of said longer planar sections in said second sheet is sufficient to receive said spaced holes therethrough.

6. A continuous belt-type magazine for continuously feeding blind rivets into and conducting sheared mandrels from a riveting tool, said rivets being of the type including a tubular sleeve having an annular head at one end thereof and a mandrel extending through the sleeve, the mandrel having an enlarged head adjacent the other end of the sleeve, comprising:
   an elongate corrugated sheet connected to one side of an elongate backing sheet thereby defining a plurality of spaced openings for receipt of said mandrels of said blind rivets and for holding said rivets as they are fed into said riveting tool, a rivet being adapted to be inserted in alternate openings, said alternate openings being of a size to snugly receive said mandrels of said rivets, the alternate spaces between said openings following the openings which receive said mandrels having shorter than the remaining alternate spaces between said openings, the length of said shorter spaces between said openings being of such a size that said sheared mandrels are loosely received between the spaced openings on opposite sides thereof; and
   means for use in advancing said magazine through said riveting tool in time sequence with the riveting operation performed thereby.

7. A magazine according to claim 6 wherein the width of said corrugated and backing sheets is approximately equal to the length of those portions of said mandrels which extend beyond said head of said sleeve of said rivets.

8. A magazine according to claim 6 wherein said means for use in advancing said magazine through said riveting tool comprises:
   a plurality of spaced holes in said backing sheet.

9. A magazine according to claim 8 wherein said spaced holes extend through said backing sheet and said corrugated sheet, through the longer spaces between said spaced openings.

10. A magazine according to claim 6 wherein the length of the longer spaces between said spaced openings is sufficient to permit receipt of rivets in said alternate spaced openings without interference between adjacent rivets as said rivets are conducted into said riveting tool and said sheared mandrels are conducted from said riveting tool.

* * * * *